(12) United States Patent
Koike (10) Patent No.: US 6,385,397 B1
(45) Date of Patent: May 7, 2002

(54) LENS-FITTED PHOTO FILM UNIT

(75) Inventor: Kazumi Koike, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/702,677

(22) Filed: Nov. 1, 2000

(30) Foreign Application Priority Data

Nov. 2, 1999 (JP) .......................... 11-312279

(51) Int. Cl.$^7$ ............................ G03B 17/02; G03B 9/02
(52) U.S. Cl. ............................. 396/6; 396/505
(58) Field of Search ................... 396/6, 505, 214, 396/216

(56) References Cited

U.S. PATENT DOCUMENTS 6,198,880 B1 * 3/2001 Hosaka et al. ............... 396/6
6,233,403 B1 * 5/2001 Aratame et al. ............. 396/6

* cited by examiner

Primary Examiner—Christopher E. Mahoney
(74) Attorney, Agent, or Firm—Young & Thompson (57) ABSTRACT

A fixed stop plate formed with a fixed stop aperture is provided behind a taking lens constituted of a first lens and a second lens. A movable stop plate formed with a smaller stop aperture is disposed behind the fixed stop aperture such that an interval between the fixed stop plate and the movable stop plate is 1.5 mm or less. A photo film is positioned behind the movable stop plate. As to the light focusing on the photo film, its portion having greater color aberration is intercepted by the movable stop plate. Thus, quality of an image recorded on the photo film is prevented from being deteriorated due to the color aberration.

10 Claims, 8 Drawing Sheets

COLOR ABERRATION OF THE POINT P

POSITION OF INCIDENT LIGHT

LENS-FITTED PHOTO FILM UNIT

BACKGROUND OF THE INVENTION

1. Field of the Invention

The present invention relates to a lens-fitted photo film unit of a type in which a stop diameter for a taking lens is changeable.

2. Description of the Related Art

A lens-fitted photo film unit manufactured and sold by the assignee of the present application is incorporated with a taking lens, a shutter mechanism and so forth, and is loaded with a photo film in advance. In virtue of such a lens-fitted photo film unit, a user may enjoy photographing easily. In the lens-fitted photo film unit, a stop aperture is fixed and an f-number of the taking lens is constant so that overexposure and underexposure are likely to occur in accordance with brightness of a subject. In view of this, it is considered to use a stop plate provided with an aperture which is smaller than the fixed stop aperture. In this case, a mechanism for changing the stop is incorporated to set the stop plate in accordance with the brightness of the subject.

Figure 8:
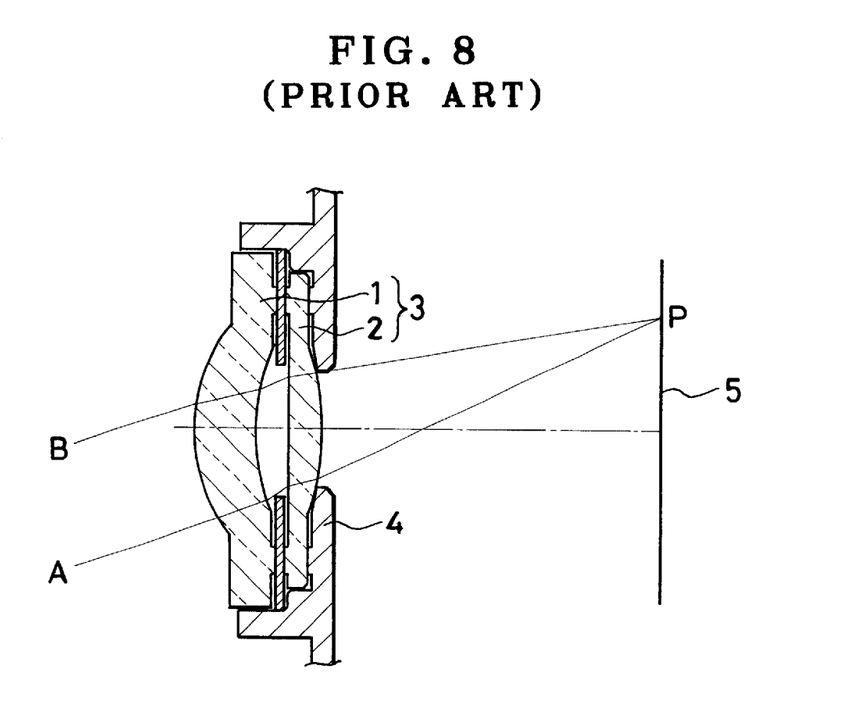
FIG. 8 is a sectional view of the taking lens in a state that the smaller stop aperture is evacuated from the optical axis.
Figure 9:
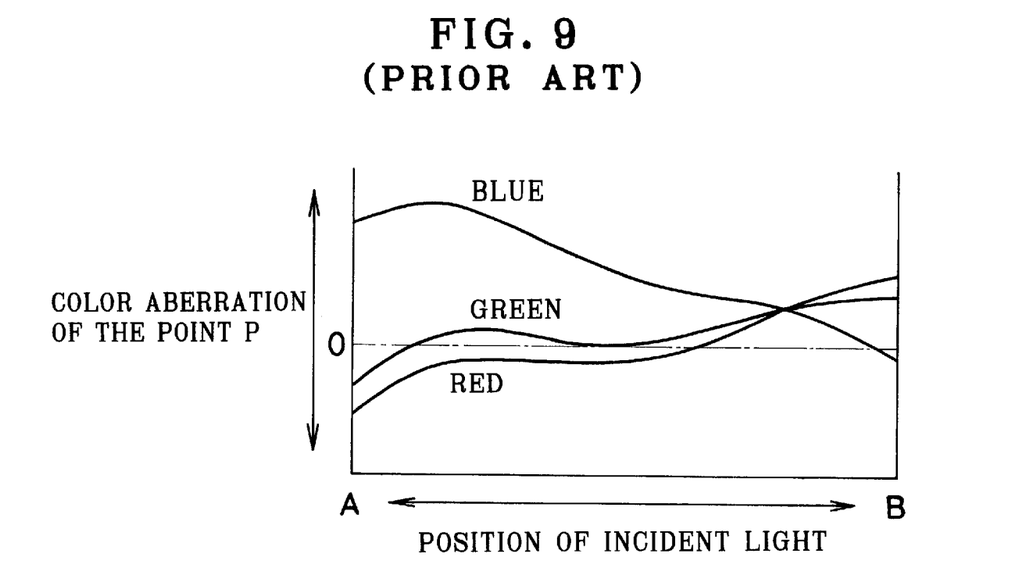
FIG. 9 is a color aberration chart of the taking lens shown in FIG. 8.

As shown in FIG. 8, the lens-fitted photo film unit employs a taking lens 3 constituted of two lenses 1 and 2. FIG. 9 shows color aberration of specific light (light between A and B in the drawing) belonging to the incidence light of the taking lens 3. The above specific light passes through an aperture formed in a fixed stop plate 4, and focuses at a point P on a photo film 5. In FIG. 9, a horizontal line represents a position of the incidence light of the taking lens 3, and a vertical line represents an amount of the color aberration at the point P. From this drawing, it is known that the light passing through the underside of the taking lens 3 (the light passing near the point A) tends to have the greater color aberration in comparison with the light passing through the upper side of the taking lens 3.

Figure 10:
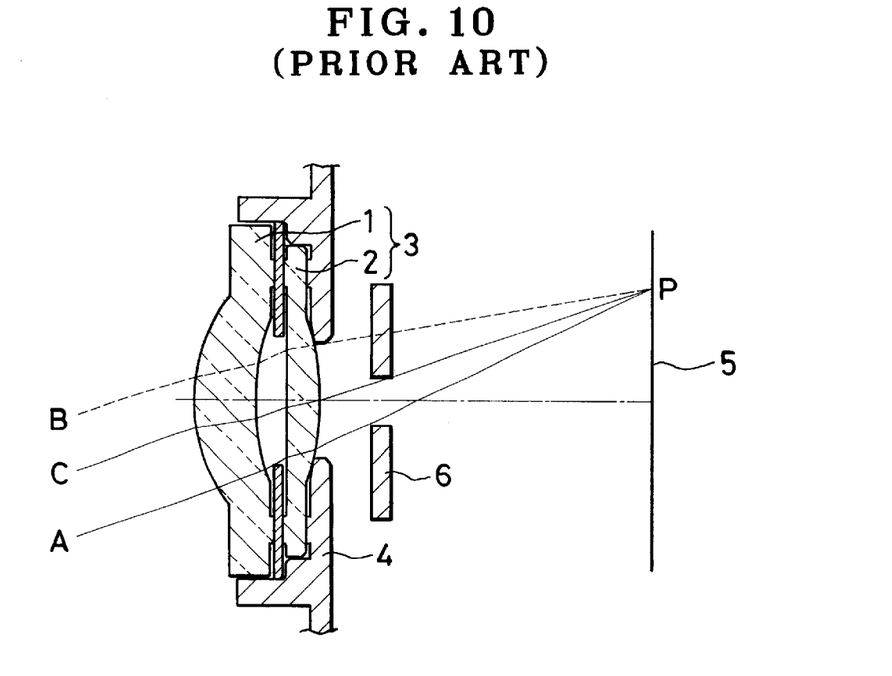
FIG. 10 is a sectional view of the taking lens in a state that an interval between the smaller stop aperture and a fixed stop aperture is wide.
Figure 11:
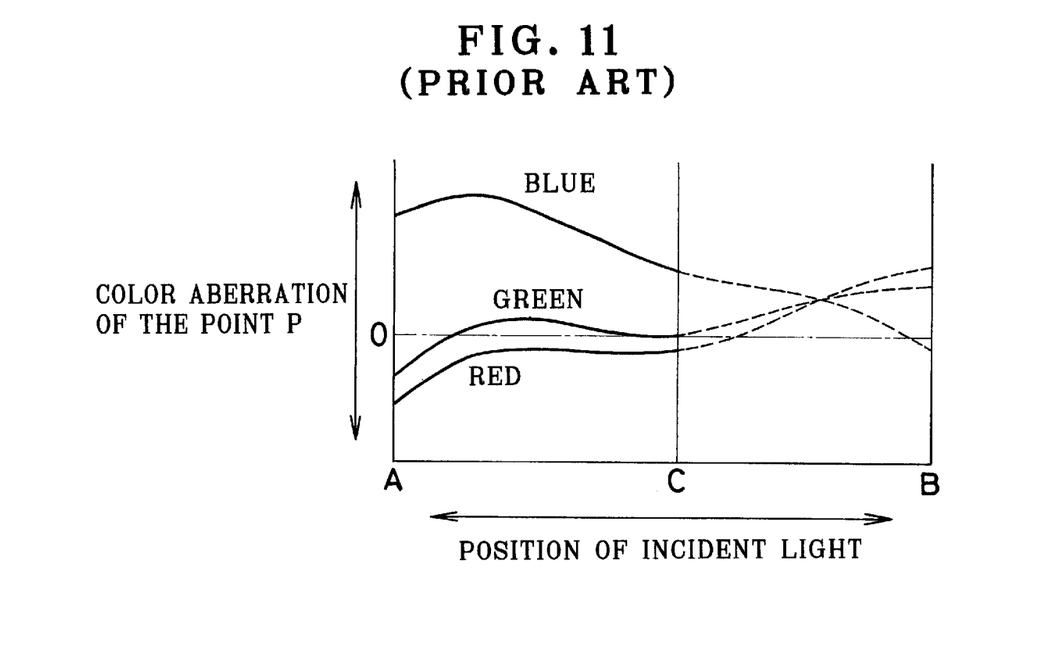
FIG. 11 is a color aberration chart of the taking lens shown in FIG. 10.

As shown in FIG. 10, when a movable stop plate 6 formed with a smaller aperture is disposed at an image side of the taking lens 3, a part of the light focusing at the point P is intercepted by the movable stop plate 6 so that an exposure amount is reduced. However, as shown in FIG. 11, an intercepted ingredient relates to only a portion between B and C (portion of dotted lines) which has the smaller color aberration. Thus, the photo film 5 is exposed by a portion between A and C (portion of solid lines) which has the greater color aberration. Hence, image quality becomes worse due to the color aberration in comparison with the case in that the movable stop plate 6 is not disposed.

SUMMARY OF THE INVENTION

In view of the foregoinq, it is a primary object of the present invention to provide a lens-fitted photo film unit in which it is possible to change a stop diameter without deteriorating image quality due to color aberration.

It is a second object of the present invention to provide a lens-fitted photo film unit in which an interval between a movable stop aperture and a fixed stop aperture may be reduced.

In order to achieve the above and other objects, the lens-fitted photo film unit according to the present invention comprises a fixed stop plate, a movable stop plate, and a stop changing mechanism.

The fixed stop plate is disposed at an image side of a taking lens constituted of two lenses, and is formed with a fixed stop aperture positioned at an optical axis of the taking lens. The movable stop plate is provided at an image side of the fixed stop plate, and is formed with a smaller stop aperture being smaller than the fixed stop aperture. The stop changing mechanism moves the movable stop plate between a setting position where the smaller stop aperture is disposed at the optical axis, and an evacuation position where the smaller stop aperture is evacuated from the optical axis. In the present invention, the fixed stop plate and the movable stop plate are arranged such that an interval between them is 1.5 mm or less along the optical axis.

In a preferred embodiment, a subject-side face of the fixed stop plate is formed with a first slope which is declined to an image side and toward an edge of the fixed stop aperture.

Further, an image-side face of the fixed stop plate is formed with a second slope which is declined to the subject side and toward the edge of the fixed stop aperture. The first slope is adapted to be longer than the second slope.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
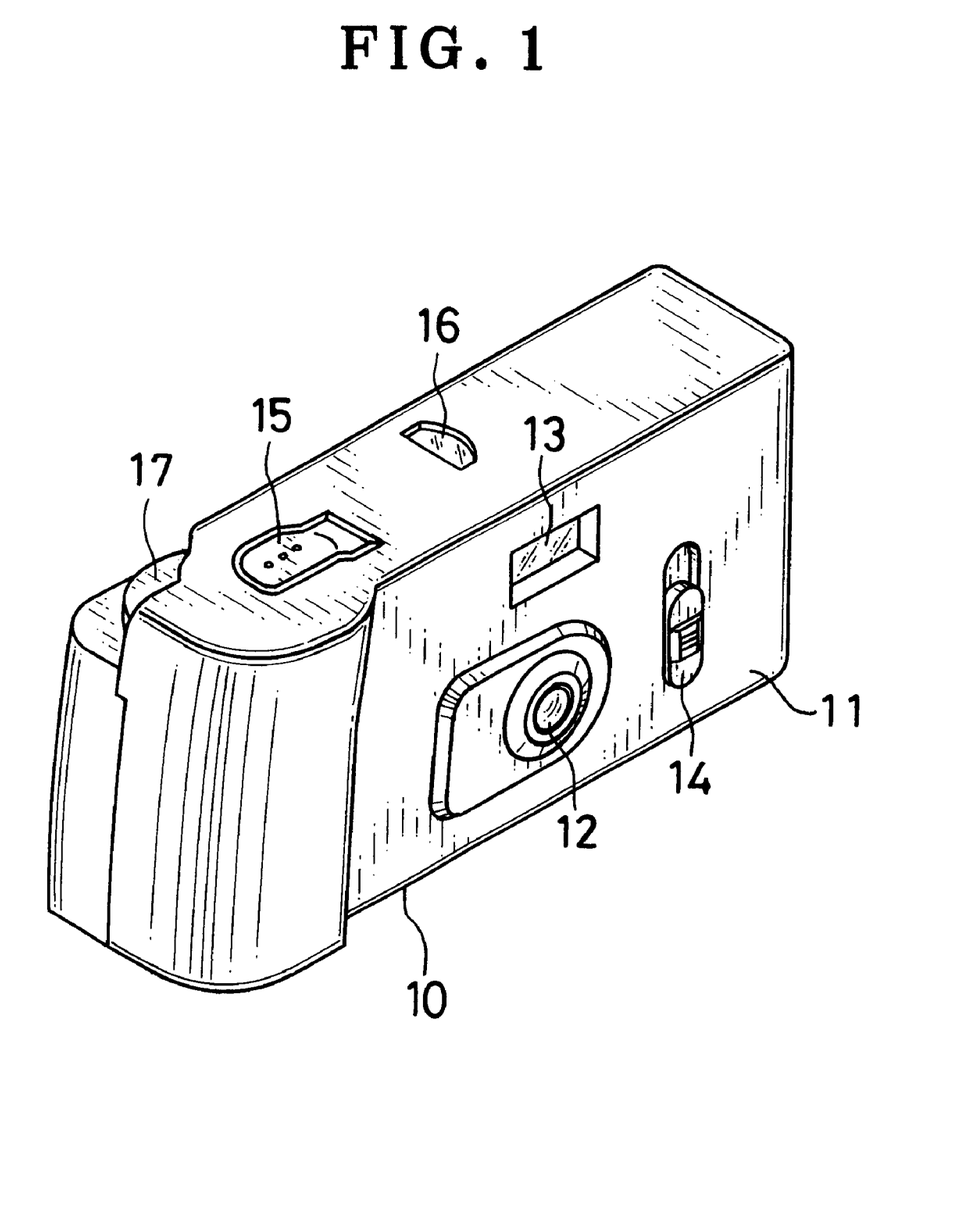
FIG. 1 is a perspective view showing a lens-fitted photo film unit.

A preferred embodiment according to the present invention is described below. As shown in FIG. 1, a lens-fitted photo film unit comprises a unit body 10 and a label 11 wound on a periphery of the unit body 10. A front face of the unit body 10 is provided with a taking lens 12, a viewfinder 13 and a stop changing lever 14. An upper portion of the unit body 10 is provided with a shutter button 15 and a film counter 16. Moreover, a rear portion of the unit body 10 is provided with a winding knob 17, and a part of which emerges to the outside.

Figure 2:
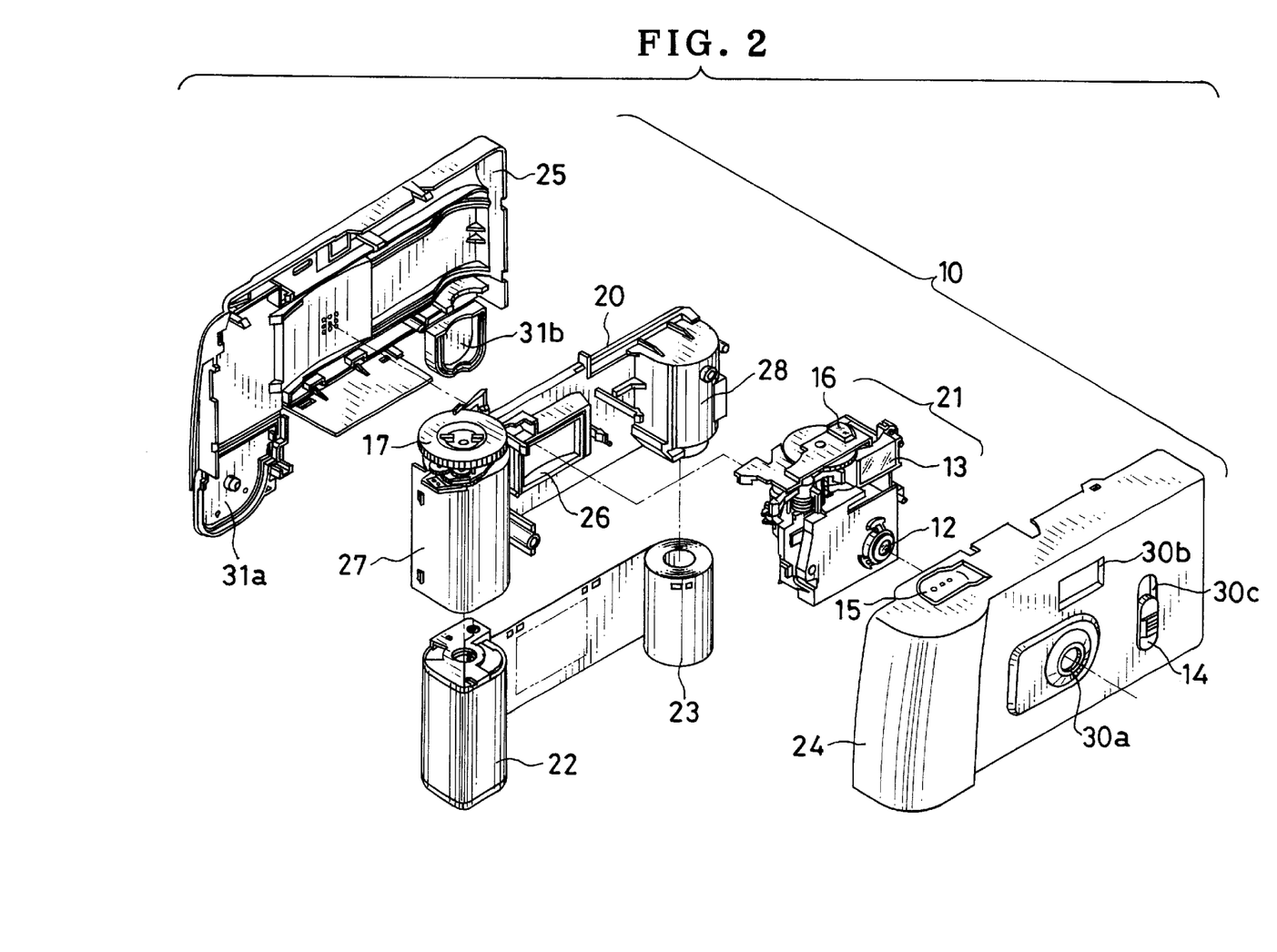
FIG. 2 is an exploded perspective view showing the lens-fitted photo film unit.

As shown in FIG. 2, the unit body 10 is constituted of a main body 20, an exposure unit 21, a cartridge body 22, a photo film 23, a front cover 24, and a rear cover 25. The center of the base body 20 is formed with an exposure aperture 26 which conducts the subject light having passed through the taking lens 12 to the photo film 23. At both sides of the exposure aperture 26, are provided a cartridge chamber 27 and a film chamber 28. The cartridge chamber 27 contains the cartridge body 22. The film chamber 28 contains the photo film 23 drawn out of the cartridge chamber 27 and wound in a roll form. Moreover, the above portion of the cartridge chamber 27 is provided with the winding knob 17 engaging with a spool of the cartridge body. A photographer can advance the photo film 23 by rotating the winding knob 21.

The front cover 24 is attached to the front face of the base body 20. The front cover 24 is formed with openings 30a, 30b and 30c through which the taking lens 12, the viewfinder 13 and the stop changing lever 14 emerge to the outside respectively. The rear cover 25 is attached to the back of the base body 20, and light-tightly covers the inside of the unit body 10 together with the front cover 24. The rear cover 25 is integrally formed with bottom lids 31a and 31b to light-tightly cover the bottoms of the cartridge body 22 and the photo film 23. Incidentally, the bottom lid 31a is opened when the cartridge body 22 is removed after exposing the photo film.

The stop changing lever 14 is disposed so as to engage with the opening 30c of the front cover 24. The opening 30c is formed such that its length in a vertical direction is longer than the stop changing lever,14. In virtue of this, the stop changing lever 14 is allowed to vertically slide between a first position and a second position. The first position is a lower side and the second position is an upper side.

Figure 3:
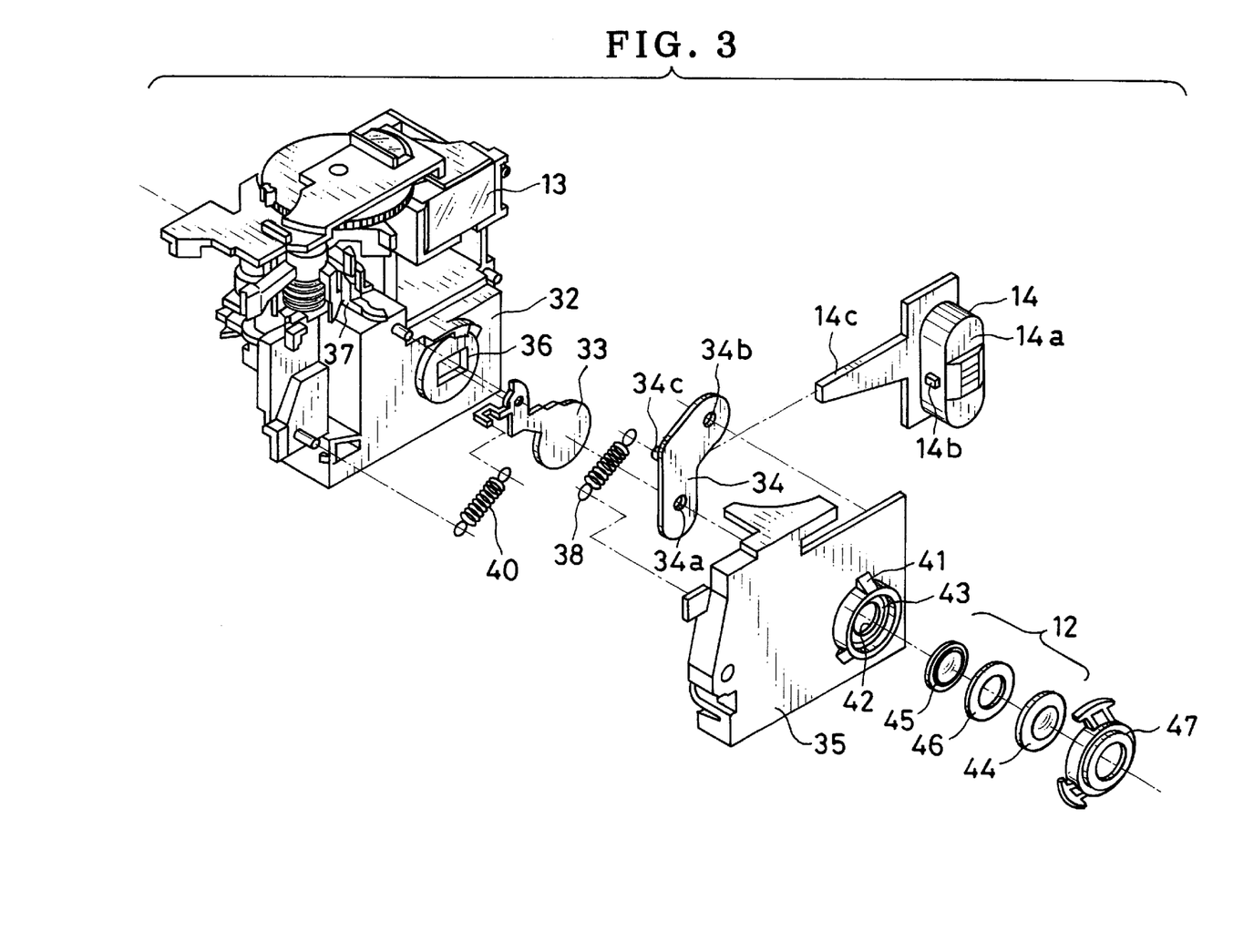
FIG. 3 is a perspective view showing the structure of a stop changing mechanism.

As shown in FIG. 3, the exposure unit 21 is constituted of a dark box 32, a shutter blade 33, a movable stop plate 34, and a shutter cover 35. The center of the dark box 32 is formed with an exposure aperture 36. Above the dark box 32, are provided the viewfinder 13, a shutter mechanism 37, a film stopping mechanism, and so forth. The shutter blade 33 is provided in front of the dark box 32 and is kept in a position where an optical axis is covered, by means of a spring 40 connected to one end of the shutter blade 33. When the shutter button 15 is depressed, the shutter mechanism 37 is actuated. Upon this, the shutter blade 33 is kicked to open the exposure aperture 36 for a predetermined period. After that, the shutter blade 33 is returned to the original position by the spring 40. Owing to this consecutive operation, exposing is performed for the non-exposed photo film 23.

The shutter cover 35 is attached to the front face of the dark box 32 so as to cover the shutter blade 33 and the movable stop plate 34. A front face of the shutter cover 35 is provided with a lens barrel 41 for containing the taking lens 12. The inside of the lens barrel 41 is provided with a fixed stop plate 43 in which a fixed stop aperture 42 is formed. A diameter of the fixed stop aperture 42 is adapted to be larger in comparison with the general lens-fitted photo film unit, since a smaller stop aperture 34a (described later) is provided.

The movable stop plate 34 is made of a sheet material having rigidity and a thickness of 0.2 mm, and is provided between the shutter blade 33 and the shutter cover 35. The movable stop plate 34 and the fixed stop plate 42 are preferable to be disposed, together with the shutter blade 33, at the optical axis and at a position near a nodal point (principal point) of the taking lens 12. For this purpose, the lens barrel 41 in which the taking lens 12 is incorporated must be provided with a slit for putting in and out the movable stop plate 34 and the shutter blade 33. In this case, however, a problem arises relative to shielding the light. Further, assembly becomes troublesome. In view of this, in the present embodiment, the fixed stop aperture 42 is provided at the end of the lens barrel 41, and the movable stop plate 34 is disposed near the back thereof. Moreover, the shutter blade 33 is disposed behind the movable stop plate 34. Owing to this, it becomes possible to arrange the fixed stop aperture 42 near the movable stop plate 34 and to approximate the shutter blade 33 relative to the movable stop plate 34, without forming the slit in the lens barrel 41. Thus, assembly properties may be kept in a good condition without deteriorating the imaging performance in accordance with the change of the stop aperture.

The movable stop plate 34 is formed with a smaller stop aperture 34a having a smaller diameter in comparison with the fixed stop aperture 42. Further, the movable stop plate 34 is provided with an opening 34b and a projection 34c. The opening 34b is used for attachment, and the projection 34c is used for moving the movable stop plate 34. The opening 34b is attached to a projection (not shown) provided on the back of the shutter cover 35. The movable stop plate 34 is rotatable around the opening 34b. The projection 34c is attached to one end of a spring 38 of which the other end is connected to a projection (not shown) provided on the shutter cover 35. The movable stop plate 34 is kept, by means of the spring 38, at a setting position where the smaller stop aperture 34a is disposed at the optical path.

The stop changing lever 14 is constituted of a knob 14a, a protrusion 14b provided at a side face thereof, and a changing section 14c provided on a back face thereof. The knob 14a is bared to the outside so that a photographer may operate it. The protrusion 14b is adapted to be clicked with a notch (not shown) formed in the front cover 24. Thus, the stop changing lever 14 may be stopped at either of the first position and the second position.

Figure 4A:
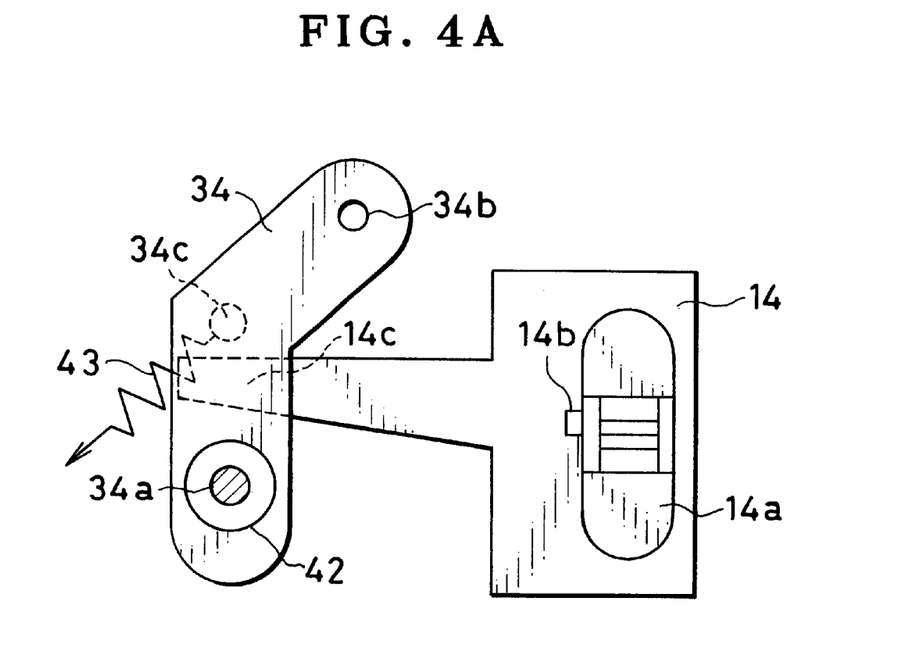
FIG. 4A is a schematic illustration partially showing the stop changing mechanism in a state that the smaller stop aperture is disposed at an optical axis.

The changing section 14c is disposed behind the movable stop plate 34. When the stop changing lever 14 is set at the first position, the changing section 14c does not abut on the projection 34c such as shown in FIG. 4A so that the movable stop plate 34 is kept in the setting position. Thus, the exposure is performed through the smaller stop aperture 34a.

Figure 4B:
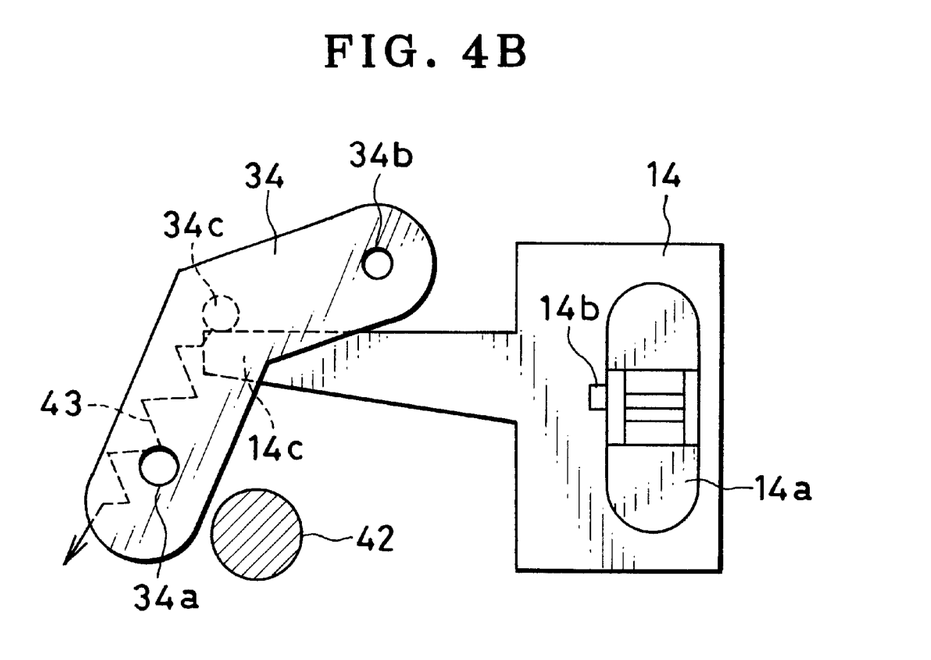
FIG. 4B is a schematic illustration partially showing the stop changing mechanism in a state that the smaller stop aperture is evacuated from the optical axis.

Meanwhile, when the stop changing lever 14 is slid, the changing section 14c abuts on the projection 34c so that the movable stop plate 34 is moved against the urging force of the spring 43. Then, upon moving the stop changing lever 14 to the second position, the movable stop plate 34 is moved to an evacuation position where the smaller stop aperture 34a is evacuated from the optical axis, such as shown in FIG. 4B. Under this condition, the exposure is performed through the fixed stop aperture 42 so that the exposure amount increases. In this way, the stop diameter at the time of exposure may be changed by sliding the stop changing lever 14.

Figure 5:
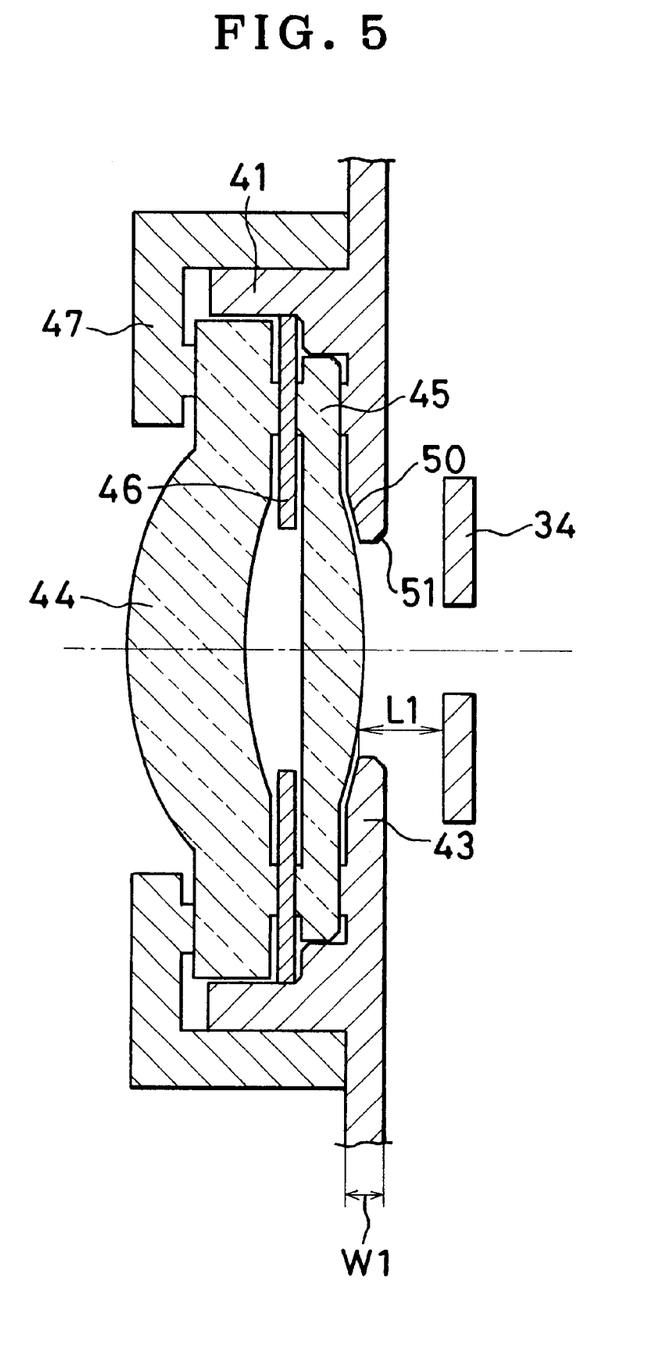
FIG. 5 is a sectional view showing the arrangement of a taking lens and the stop apertures.
Figure 6:
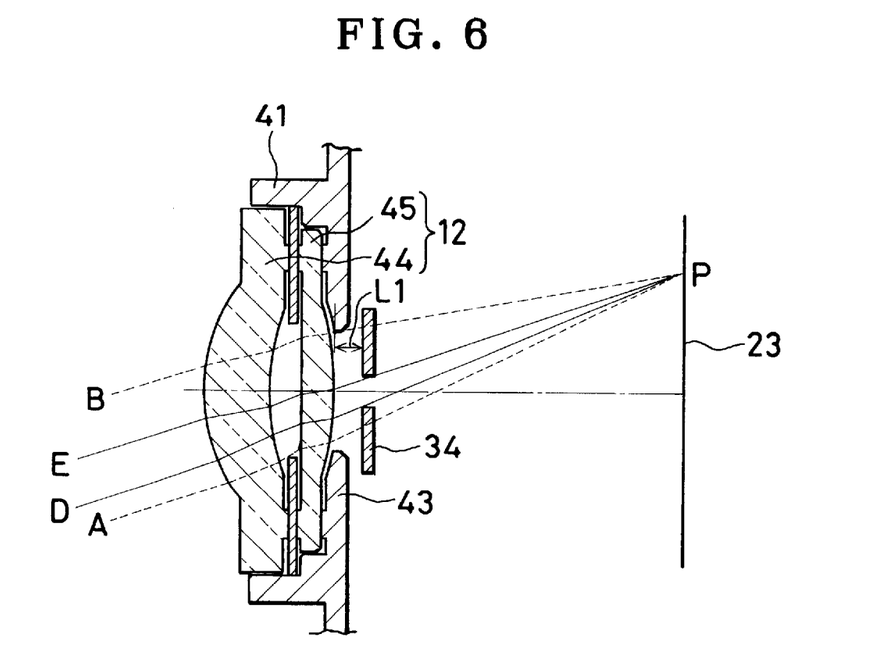
FIG. 6 is a sectional view of the taking lens in a state that the interval between the smaller stop aperture and the fixed stop aperture is 1.5 mm or less.
Figure 7:
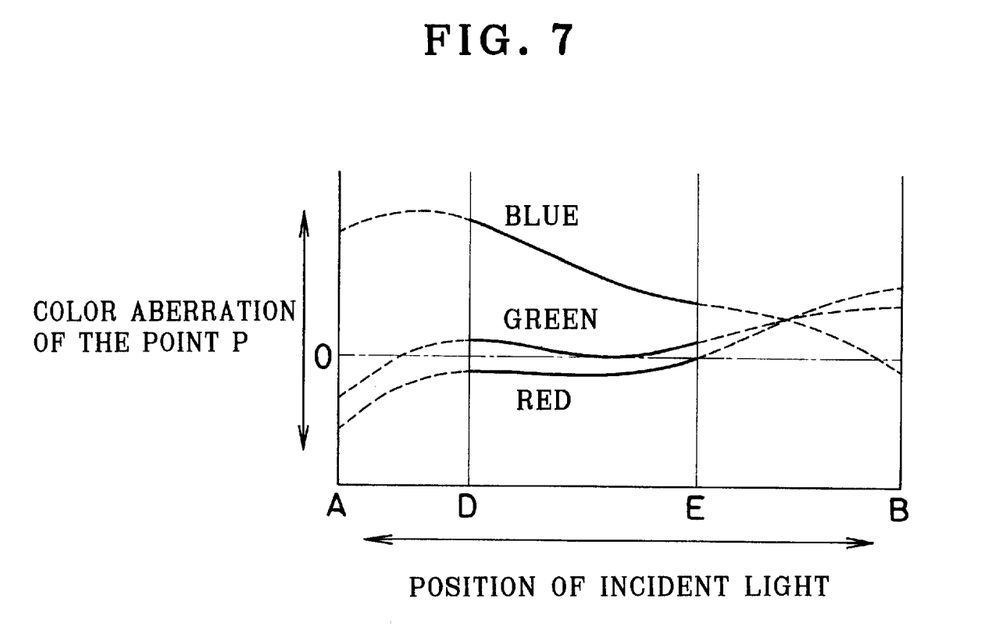
FIG. 7 is a color aberration chart of the taking lens shown in FIG. 6.

The taking lens 12 is constituted of a first lens 44 and a second lens 45, and between which a light shielding plate 46 having a ring shape is disposed. These parts are contained in the lens barrel 41. As shown in FIG. 5, a lens holder 47 attached to the front of the lens barrel 41 holds a periphery of the first lens 44 so that the taking lens 12 is interposed between the lens barrel 41 and the lens holder 47 to be held. Incidentally, the light shielding plate 46 is provided for shielding the light passing through the periphery of the first lens 44.

The movable stop plate 34 is disposed such that a length L1 between the fixed stop aperture 42 and the smaller stop aperture 34a is 1.5 mm or less. Under this condition, as shown in FIGS. 10 and 11, the light focused at the point P is removed relative to not only a portion (between B and E) having the smaller color aberration but also a portion (between A and D) having the greater color aberration. Accordingly, only the light between D and E is used for photographing so that the deterioration of the image quality due to the color aberration is reduced in comparison with the case in that the length L1 is longer (FIG. 11).

A subject-side face of the fixed stop plate 43 is formed with a first slope 50 which is declined to an image side and toward an edge of the fixed stop aperture 42. In virtue of the first slope 50, the length L1 may be reduced without making worse the strength of the shutter cover 35. Thus, the deterioration of the image quality due to the color aberration is further prevented. Moreover, an image-side portion of the fixed stop plate 43 is formed with a second slope 51 which is declined to the subject side and toward the edge of the fixed stop aperture 42, since it is necessary to perform chamfering in a processing step of the lens-fitted photo film unit. This second slope 51 does not contribute for reducing the length L1. Further, there is a possibility to make worse the strength of the fixed stop plate 43. In view of this, it is preferable to form the second slope 51 as small as possible and to make the first slope 50 longer than the second slope 51.

An operation of the above-mentioned structure is described below. When a light amount of a subject is large such as out-door photographing under the fine weather, a photographer primarily confirms that the stop changing lever 14 is kept in the first position. After that, the photographer rotates the winding knob 17 to advance the photo film 23. When the photo film 23 is advanced by one frame, the film stopping mechanism is actuated to stop the advancement of the photo film 23. Successively, the photographer watches the subject through the viewfinder 13 to determine the photographic composition. Upon depression of the shutter button 15, the photo film 23 is exposed to take a picture of the subject.

At this time, the exposure is performed through the smaller stop aperture 34a so that an exposure amount is reduced to a proper value. Moreover, the interval between the fixed stop aperture 42 and the smaller stop aperture 34a is sufficiently small and the light having the great color aberration is removed, so that it is possible to obtain a photo print in which the deterioration of the image quality due to the color aberration is reduced.

On the other hand, when the light amount of the subject is small such as photographing in the night, the photographer moves the stop changing lever 14 to the second position. After that, the photographer carries out an operation to expose the photo film 23 similarly to the case in that the light amount of the subject is large. At this time, the smaller stop aperture 34a is evacuated from the optical axis. Hence, the exposure is performed through the fixed stop aperture 42 having the larger stop diameter. Thus, it is possible to obtain a sufficiently great amount of the exposure.

As described above, according to the present invention, the lens-fitted photo film unit comprising the stop changing mechanism is provided with the smaller stop aperture and the fixed stop aperture, the interval of which is 1.5 mm or less. Thus, it is possible to obtain a photo print in which the deterioration of the image quality due to the color aberration is reduced. Moreover, the slop is provided on the taking-lens side of the fixed stop aperture so that the interval between the smaller stop aperture and the fixed stop aperture maybe further reduced.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit having a taking lens constituted of a first lens and a second lens, said lens-fitted photo film unit comprising:
   a fixed stop plate provided at an image side of said taking lens;
   a fixed stop aperture formed in said fixed stop plate and disposed at an optical axis of said taking lens;
   a movable stop plate movably provided at an image side of said fixed stop plate, an interval between said movable stop plate and said fixed stop plate being 1.5 mm or less in an optical-axis direction;
   a smaller stop aperture formed in said movable stop plate and having a smaller diameter in comparison with said fixed stop aperture; and
   a stop changing mechanism for moving said movable stop plate between a setting position where said smaller stop aperture is disposed at said optical axis, and an evacuation position where said smaller stop aperture is evacuated from said optical axis.

2. A lens-fitted photo film unit according to claim 1, wherein a subject-side face of said fixed stop plate is formed with a first slope which is declined to the image side and toward an edge of said fixed stop aperture.

3. A lens-fitted photo film unit according to claim 2, wherein an image-side face of said taking lens is disposed along said first slope, and a central portion of said image-side face enters said fixed stop aperture.

4. A lens-fitted photo film unit according to claim 3, wherein an image-side face of said fixed stop plate is formed with a second slope which is declined to the subject side and toward said edge of said fixed stop aperture, said first slope being longer than said second slope.

5. A lens-fitted photo film unit according to claim 4, wherein said stop changing mechanism comprises:
   an externally operatable knob;
   a changing section projecting from said knob and disposed behind said movable stop plate; and
   a protrusion provided on a rear face of said movable stop plate and abutting on said changing section, said movable stop plate being moved to said evacuation position by pushing said protrusion with said changing section.

6. A lens-fitted photo film unit according to claim 5, wherein said knob is disposed on a front face of said lens-fitted photo film unit.

7. A lens-fitted photo film unit according to claim 6, wherein said stop changing mechanism further comprises:
   a spring for engaging with said protrusion of said movable stop plate, said spring keeping said movable stop plate in said setting position.

8. A lens-fitted photo film unit according to claim 7, further comprising:
   a light shielding plate disposed between said first lens and said second lens, said light shielding plate having a ring shape and intercepting a light entering from a periphery of said taking lens.

9. A lens-fitted photo film unit according to claim 8, further comprising:

a lens holder for holding said taking lens, between said lens holder and said fixed stop plate, said taking lens being held.

10. A lens-fitted photo film unit having a taking lens constituted of a first lens and a second lens, said lens-fitted photo film unit comprising:

a fixed stop plate provided at an image side of said taking lens;

a fixed stop aperture formed in said fixed stop plate and disposed at an optical axis of said taking lens;

a movable stop plate movably provided at an image side of said fixed stop plate;

a smaller stop aperture formed in said movable stop plate and having a smaller diameter in comparison with said fixed stop aperture, an interval between front edges of said smaller stop aperture and said fixed stop aperture being 1.5 mm or less in an optical-axis direction; and a stop changing mechanism for moving said movable stop plate between a setting position where said smaller stop aperture is disposed at said optical axis, and an evacuation position where said smaller stop aperture is evacuated from said optical axis.

* * * * *